Oct. 8, 1957 L. A. HOROWITZ 2,809,356

COUPLING CIRCUITS FOR HIGH FREQUENCY SIGNALS

Filed Dec. 1, 1953

INVENTOR.

LEOPOLD A. HOROWITZ

BY [signature]

ATTORNEY

United States Patent Office 2,809,356

Patented Oct. 8, 1957

2,809,356

COUPLING CIRCUITS FOR HIGH FREQUENCY SIGNALS

Leopold A. Horowitz, Haddonfield, N. J., assignor to Radio Corporation of America, a corporation of Delaware Application December 1, 1953, Serial No. 395,336

7 Claims. (Cl. 333—26)

The present invention generally relates to electrical circuit coupling networks, and more particularly to coupling circuits and the like for high frequency signals between balanced and unbalanced signal translating circuits.

This invention has particular applicability to coupling networks and the like, operable over a wide range of very high or ultra-high frequencies for coupling balanced or symmetrical circuits with unbalanced or unsymmetrical circuits without disturbing the inherent electrical characteristics of the two circuits.

In numerous instances, it is desirable or necessary to join an unbalanced circuit such as a coaxial transmission line with a balanced transmission line such as a parallel wire line or shielded pair. Such a transition can not be made directly since the junction would present a discontinuity in the electrical characteristics of the line, and would result in a disturbance causing considerable loss due to unbalanced line currents or energy reflection.

Various networks for coupling balanced and unbalanced circuits at a particular frequency have been proposed. To operate satisfactorily over a wide frequency band such networks are generally quite complicated. Simpler coupling circuits using coaxial line sections have been provided with certain inter-connections between the inner conductors and the shields of the coaxial line sections. However, in these relatively simple systems, the coupling circuit is generally made in the form of a half wave line section which is tuned to the operating frequency. As a consequence these coupling circuits or couplers are useful over only relatively narrow frequency bands.

Standard antenna systems generally used in the reception of very high frequency and ultra-high frequency signal modulated carrier waves are of the balanced, or symmetrical type. Modern receivers, such as television receivers, for example, are almost exclusively designed with unsymmetrical, coaxial line input circuits because of economic and engineering advantages. It is standard practice to convey the received signals from the antenna system through a balanced parallel wire transmission line to the receiver input circuit. As outlined above, proper coupling means are required to join the two dissimilar systems so that each system may be correctly terminated to enable optimum power transfer over the frequency band to be received. Furthermore, in view of the existing thirteen channels in the V.-H.-F. range extending from 55 to 215 megacycles (mc.) and the seventy channels assigned in the U.-H.-F. region extending from 470 to 890 megacycles, (mc.), a coupling circuit for television U.-H.-F. or V.-H.-F. reception must be capable of efficiently handling signals over an extremely wide frequency range.

It is a principal object of the present invention to provide a relatively simple and efficient means for coupling balanced and unbalanced radio frequency signal circuits operating over a wide band of radio frequencies.

Since the size and cost of the components are important considerations, particularly in connection with commercial television receivers, it is a further object of this invention to provide an efficient wide frequency band coupling circuit which is relatively small in size, simple and compact in form and easily reproducible by mass production techniques, for coupling tunable high frequency signal translating circuits.

In accordance with the invention, a coupling circuit is provided which consists of terminal connection means for the circuits or lines to be coupled, a capacitor, and a section of transmission line preferably being bent in the form of a loop. One conductor of the transmission line loop connects the terminals of the balanced transmission line, and the ends of the other conductor are connected together and to a point of reference potential or ground for the system. The capacitor is connected between one of the balanced transmission line terminals and said ground, and the unbalanced line is connected between the other balanced line terminal and said ground respectively. The parameters of the short section of transmission line and the capacitor are selected so that they provide a line which is effectively one half wave length at the high frequency end of a predetermined frequency band, and also provide a tuned circuit which is resonant near the low frequency end of the band.

Accordingly, another object of the invention is to provide a simple electrical coupling network efficiently operable over a wide range of frequencies for coupling balanced and unbalanced circuits without producing any substantial disturbance of the balanced or unbalanced circuits so coupled.

The novel features that are considered characteristic of this invention are set forth with particularity in the appended claims. The invention itself, however, both as to its organization and method of operation, as well as additional objects and advantages thereof, will be best understood from the following description when read in connection with the accompanying drawings in which:

Figure 1:
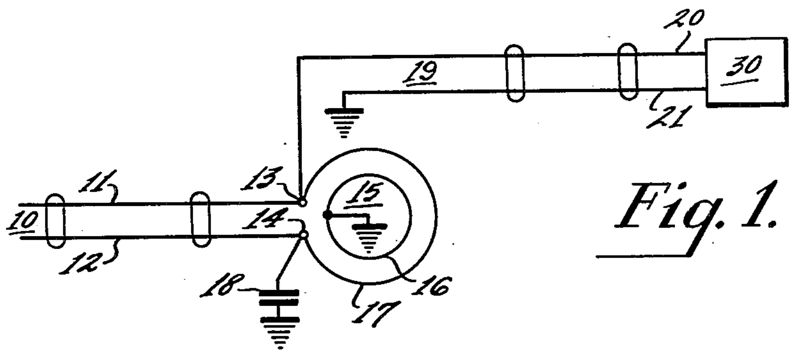
Figure 1 is a schematic circuit diagram of a coupling circuit or network embodying the invention.

Referring now to the drawings wherein like reference characters are used in the several figures to designate like components or equivalents thereof, and referring particularly to Figure 1, a balanced signal transmission line 10 comprising a pair of parallel conductors or leads 11 and 12 and having a predetermined characteristic impedance, is connected with a pair of terminals 13 and 14 of a coupling circuit 15. Each conductor of the transmission line 10 is balanced with respect to ground. The line for example, may be a balanced 300 ohm transmission line for conveying signal modulated carrier waves from a high frequency antenna.

The coupling circuit 15 comprises a capacitor 18 and a relatively short section of twin-conductor transmission line having a pair of parallel conductors 16 and 17. The twin-conductor line is bent into a circular loop for reducing the space required by the coupling circuit and facilitating circuit connections thereto. The conductor 17 is connected between terminals 13 and 14, and the ends of the conductor 16 are connected together at a point of fixed reference potential or ground. The capacitor 18 is connected between the terminal 14 and ground which is effectively across one end of the transmission line loop.

The parameters of a coupling circuit constructed in accordance with the invention are such that the circuit meets the following requirements: First, the transmission line loop formed by the conductors 16 and 17 when considered in combination with the capacitor 18 effectively provides a one half wave transmission line section near the high frequency end of the predetermined range of signal frequencies to be coupled. Secondly, the inductance of the conductor 17 in series with the capacitance of the capacitor 18 is resonant at a frequency near the low frequency end of the range. It has been found that such a coupling network provides excellent transfer of signal energy from balanced to unbalanced circuits over a very wide range of frequencies without producing any substantial disturbance of these circuits.

The unbalance circuit may be comprised of a two-conductor unbalanced transmission line 19 having a pair of conductors 20 and 21 and circuit load means 30. The high side 20 of the unbalanced line 19 is connected with the terminal 13, while the conductor 21 is connected with ground.

In the construction of a coupling circuit to cover the U.-H.-F. television band from 470 to 890 megacycles, the following components are found to provide excellent performance. The transmission line loop is formed of a three inch section of 72 ohm transmission line. The transmission line conductors are 24AWG solid bare copper wire spaced on the order of one tenth of an inch by a polyethylene or an amphenol insulating material. The size of the capacitor is selected as 2.2 micromicrofarads (mmfd.).

The transmission line loop comprised of the conductors 16 and 17 is designed to be physically shorter than one half wave length at the high frequency end of the band (900 megacycles). The length of the transmission line loop is effectively increased by the connection of the capacitor 18 across one end thereof in a manner that is well known to the art. The size of the capacitor 18 is chosen so that the transmission line loop appears to be approximately a half wave length at the high frequency end of the band. Thus at the high frequency end of the band, the balance-to-unbalance transformation is effectively accomplished by a half wave balun, the operation of which is substantially the same as the half wave balun shown in the U. S. Patent to Buschbeck et al. 2,271,182.

As hereinbefore noted, the capacitor 18 and the effective inductance of the conductor 17 must also resonate at a frequency near the low frequency end of the desired frequency band. By reference to Figure 2, it will be noted that the conductor 17 may be schematically represented as a transformer primary winding, having a short-circuited secondary winding 16. The inductance of the primary winding 17 is somewhat reduced by the effect of the shorted secondary winding 16. It can be seen that a set of values must be reached for the transmission line and the capacitor 18 whereby the coupling circuit will respond to the different ends of the desired frequency band in the manner indicated.

Figure 2:
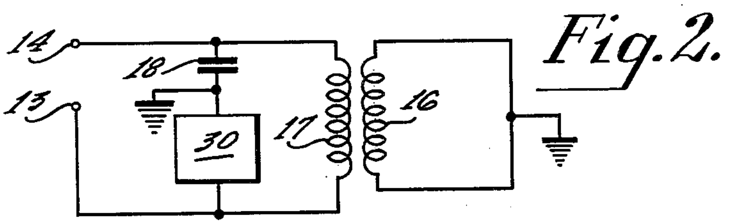
Figure 2 is an equivalent schematic circuit diagram of the coupling circuit shown in Figure 1.

As is best shown in the equivalent schematic diagram of Figure 2, the load means 30, which may be ssumed to be substantially resistive, is effectively connected between the terminal 13 and ground. The effective load impedance provided by the load means 30 comprises the net effect of the unbalanced transmission line 19 and its terminal connections. The load means 30, in combination with the capacitor 18 and the inductor 17 provide a parallel resonant circuit as viewed from the balanced line.

The resistive load means 30 absorbs energy from the resonant circuit 17, 18 and thus tends to damp the circuit. This damping considerably lowers the Q of the circuit, and in the device constructed as set forth above, a Q or 3 was used. The low Q gives a broadband frequency response which in the device referred to above is about 200 megacycles when the parallel resonant circuit is tuned to about 600 megacycles. Thus, good balance to unbalance transformation can be had in the frequency range from 500 to 700 megacycles.

Since the coupling circuit is also peaked to respond to frequencies near the high frequency end of the band (900 megacycles) by the half wave balun action as hereinbefore described, the composite action of the coupling circuit at the high and low frequency ends of the band enable an efficient transfer of signals over the entire frequency range.

In commercial television receivers the input impedance of the unbalanced signal selecting or tuner circuits is generally designed to be about 72 ohms. The impedance of the balanced transmission line from the antenna is usually 300 ohms, thus necessitating not only a balanced to unbalanced signal transfer but also a 4–1 impedance match.

At the high frequency end of the band this impedance match is provided by the half wave balun in a well known manner. To obtain the proper impedance match at the low frequency end the relative impedance values of the capacitor 18 and the load means 30 are approximately 3–1 in the range of frequencies near the low frequency end of the band. Thus, a 300 ohm balance circuit may be connected across the series combination of the 75 ohm load 30 and the 225 ohm capacitive reactance of the capacitor 18.

Figure 3:
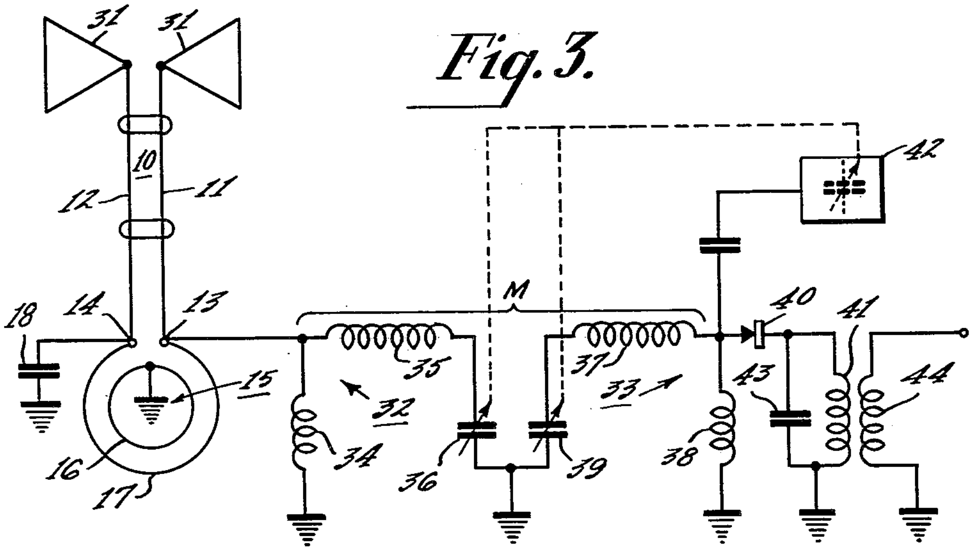
Figure 3 is a schematic circuit diagram of an ultra-high frequency tuning system for a television receiver, or the like, illustrating the use of the coupling circuit shown in Figure 1 in accordance with the invention.

Referring now to Figure 3 and the high frequency tuner circuit which employs the coupling network of the invention, an ultra-high frequency antenna 31 represents any conventional signal pickup means for receiving signal modulated carrier wave energy. For receiving television signals this antenna should have a characteristic impedance of approximately 300 ohms, and is connected by means of a balanced transmission line 10 having a pair of conductors 11 and 12 to the terminals 13 and 14 of the coupling network 15. The transmission line 10 may be any conventional twin-conductor balanced line having good performance characteristic up to 900 megacycles and having an impedance of 300 ohms to match the impedance of the antenna. The coupling network 15, which is connected with the terminals 13 and 14, is the same as that shown in Figure 1.

The unbalanced receiver tuner input is connected to the coupling network of the invention at the terminal 13. The tuning unit shown is of the variable ganged capacitor type having a pair of coupled resonant signal selecting circuits 32 and 33. The first resonant circuit 32 includes the inductors 34, 35 and the capacitor 36, and the second circuit 33 includes the inductors 37, 38 and the capacitor 39. The capacitors 36 and 39 are ganged to tune the pair of resonant circuits over a wide ultra-high frequency range.

The inductors 35 and 37 are mutually coupled to provide a broad bandpass characteristic for the signal transfer. A crystal mixer 40 is connected between the junction of the inductors 37 and 38 to detect the carrier wave signal energy. The ultra-high frequency oscillator 42 is tunable with the input circuits 32 and 33, to provide a local oscillator signal for mixing with the carrier wave signal energy and may be coupled with the mixer in any well known suitable manner. The heterodyned or intermediate frequency signal is taken from the mixer 40 and conveyed through an intermediate frequency transformer which has a primary winding 41 which is tuned to the intermediate frequency by the shunt capacitor 42. An output terminal is connected with the secondary winding 44 of the intermediate frequency transformer, and utilization means such as a V.-H.-F. television receiver may be connected therewith.

It can be seen that an improved, inexpensive, and highly efficient coupling circuit operable over a broadband of frequencies may be provided in accordance with the invention. The coupling circuit provides efficient signal transfer without disturbing the electrical characteristics of the coupled circuits, and also provides a desired impedance match between these circuits. This coupling circuit finds general application in the signal communications art and finds particular utility in connection with the antenna input circuits for television U.-H.-F. and V.-H.-F. signal receivers.

What is claimed is:

1. A high frequency coupling circuit operable over a predetermined wide range of frequencies for balanced and unbalanced electrical circuits, comprising a pair of circuit connection terminals, a section of two-conductor transmission line, the length of said transmission line being shorter than one half wave length at the high frequency end of said range, means connecting one conductor of said transmission line between said circuit connection terminals, a capacitor connected between the conductors at one end of said transmission line, the capacitance value of said capacitor and parameters of said transmission line providing substantially a one half wave length transmission line section at the high frequency end of said range, and said capacitor and the effective inductance of said one conductor providing a tuned circuit resonant at a frequency near the low frequency end of said range.

2. A high frequency coupling circuit as defined in claim 1, wherein said capacitor and the effective inductance of said one conductor provide a circuit resonant at a frequency above the low frequency end of the said range.

3. A high frequency coupling circuit operable over a predetermined wide range of frequencies for balanced and unbalanced electrical circuits, comprising a pair of circuit connection terminals, means connecting a balanced electrical circuit with said terminals, a section of two-conductor transmission line, means connecting one conductor of said line between said terminals, means connecting the ends of the other conductor of said line with ground potential, a capacitor connected between one of said terminals and ground, the value of said capacitor and the parameters of said transmission line providing substantially a one half wave length transmission line section at a frequency near the high frequency end of said range, and said capacitor and the effective inductance of said one conductor providing a tuned circuit resonant at a frequency near the low frequency end of said range, and an unbalanced circuit connected between the other of said terminals and ground.

4. A high frequency coupling circuit as defined in claim 3, wherein said capacitor and the effective inductance of said one conductor provide a circuit resonant at a frequency above the low frequency end of said range.

5. A high frequency coupling circuit as defined in claim 3, wherein said two-conductor transmission line is bent into a loop.

6. A high frequency wide band coupling circuit for a pair of signal conveying circuits having balanced and unbalanced electrical characteristics with respect to the point of fixed reference potential comprising a pair of circuit connection terminals, means connecting a signal circuit having balanced characteristics with said terminals, a loop comprised of a section of parallel conductor transmission line, means connecting one of the conductors of said transmission line between said terminals, a common junction point for the ends of the other conductor of said transmission line, a capacitor connected between one of said terminals and said common junction, the value of said capacitor and the parameters of said transmission line providing substantially a one half wave length transmission line section at a frequency near the high frequency end of said wide band, and said capacitor and the effective inductance of said transmission line providing a tuned circuit presonant at a frequency to provide efficient signal transfer between said balanced and unbalanced signal conveying circuits at frequencies near the low frequency end of said wide band, and a signal circuit having unbalanced characteristics connected between the other of said terminals and said point of reference potential.

7. A relatively small size, compact coupling unit providing wide frequency band coupling circuit for ultra high frequency circuits, comprising a section of parallel conductor transmission line approximately three inches in length bent into a substantially closed-loop configuration, a pair of signal circuit connection terminals, means connecting one conductor of said transmission line between said terminals, means connecting the ends of the other conductor of said transmission line with ground for said circuit, and a capacitor of approximately 2.2 micro-microfarads connected between one of said terminals and said ground.

References Cited in the file of this patent

UNITED STATES PATENTS 2,271,182 Buschbeck et al. -------- Jan. 27, 1942

OTHER REFERENCES

"Transmission Lines, Antennas and Wave Guides," by King, Mimno and Wing; McGraw-Hill Book Co., Inc., 1945, 1st edition; pp. 33 and 34. (Copy in Div. 69.)